Jan. 15, 1963     D. W. COLE     3,073,268
APPARATUS FOR BRAZE-BONDING METALLIC PARTS
Filed April 4, 1957     2 Sheets-Sheet 1
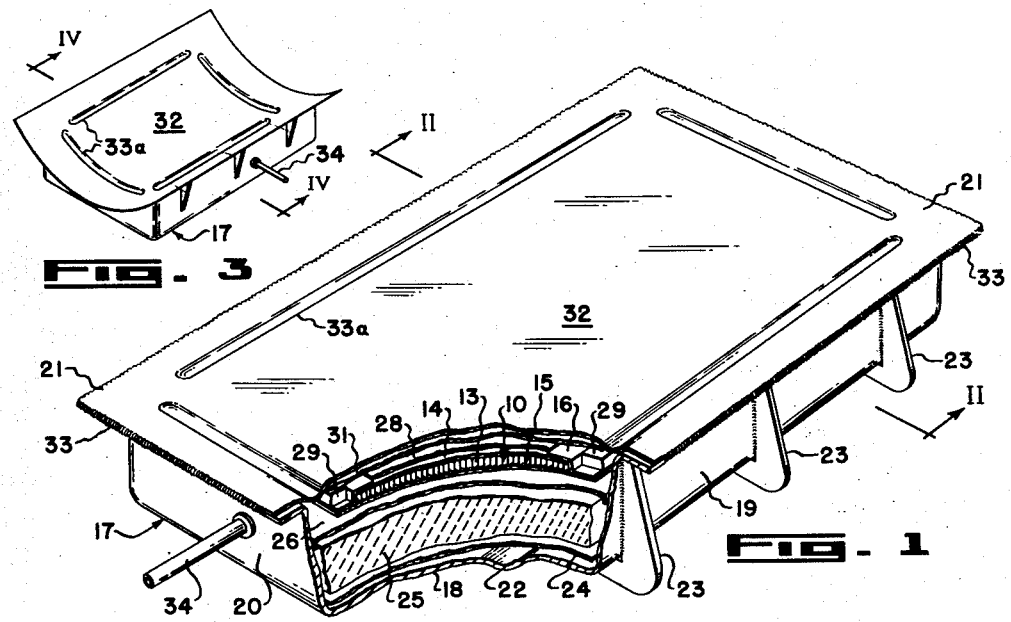
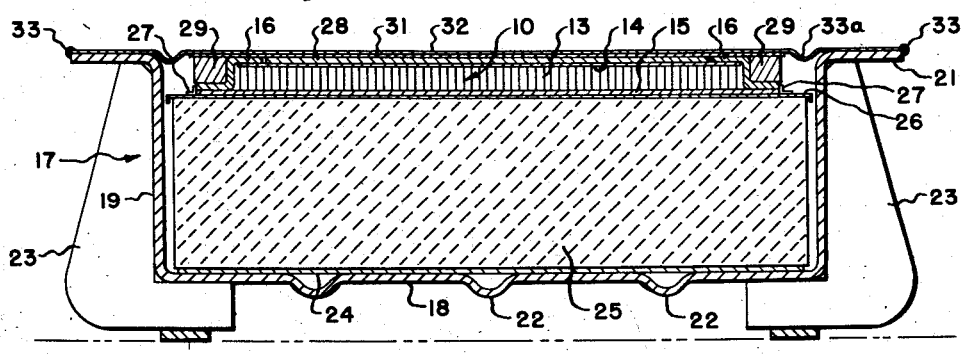
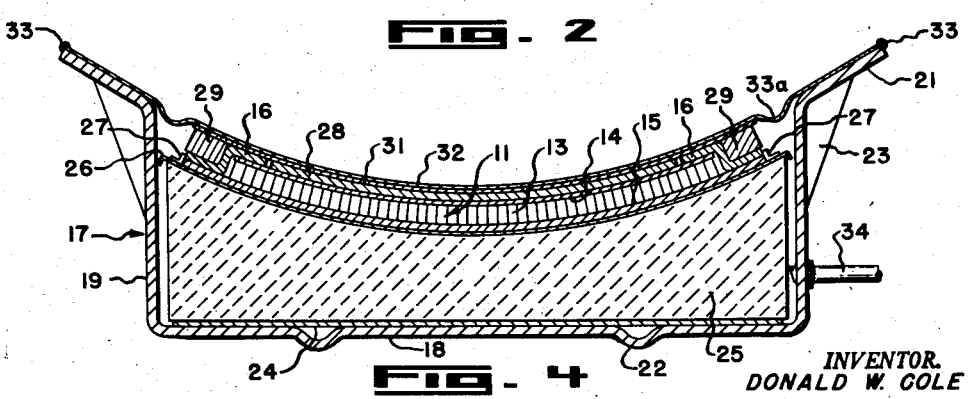
INVENTOR.
DONALD W. COLE
BY
*Walter J. Jason*
ATTORNEY

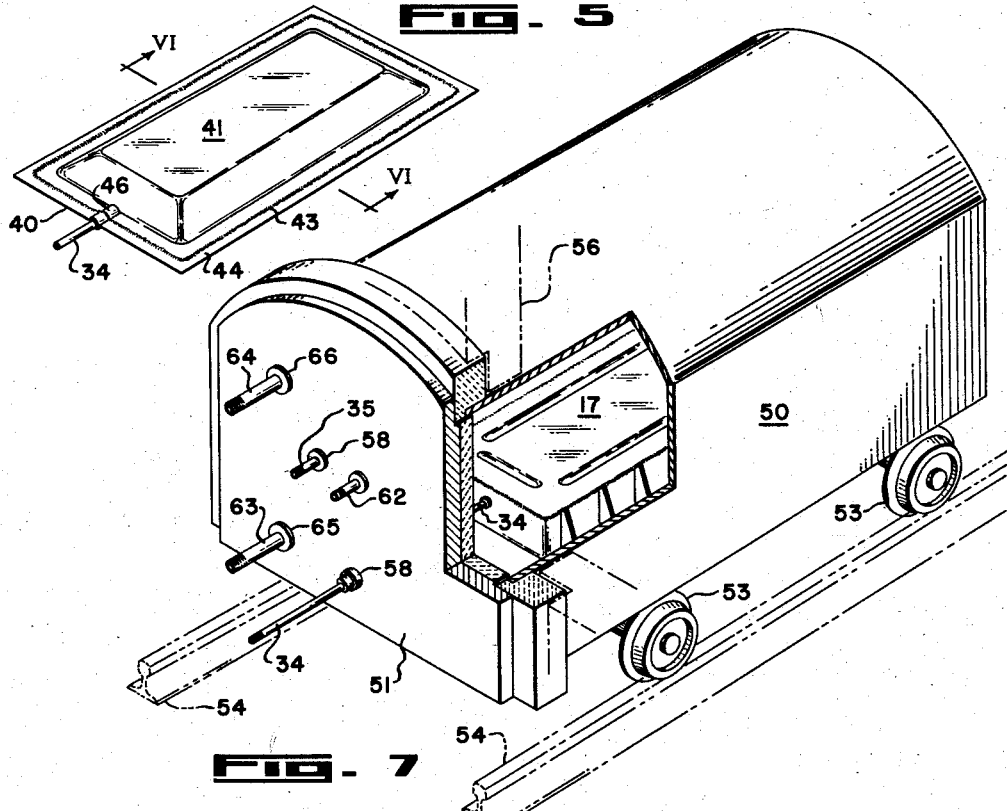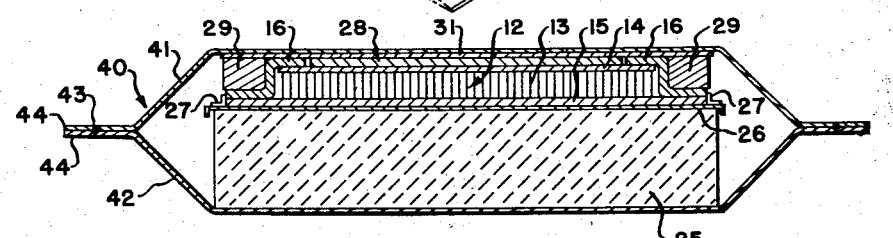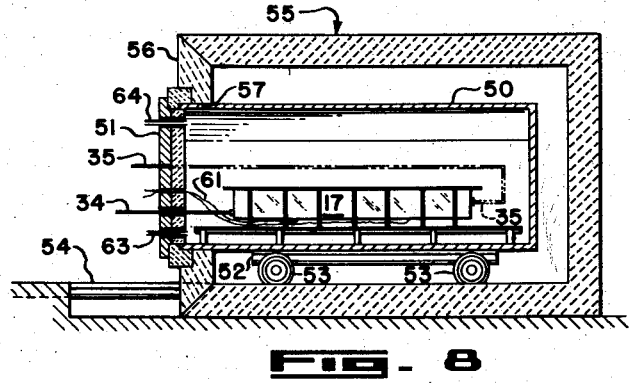

United States Patent Office 3,073,268
Patented Jan. 15, 1963

3,073,268
APPARATUS FOR BRAZE-BONDING
METALLIC PARTS
Donald W. Cole, Weatherford, Tex., assignor to General
Dynamics Corporation, San Diego, Calif., a corporation
of Delaware
Filed Apr. 4, 1957, Ser. No. 650,728
2 Claims. (Cl. 113—99)

The present invention relates generally to a means for uniting metal components and more particularly to a means for braze bonding metal cellular core to other metallic elements.

Modern high-speed aircraft and missiles are characterized by the exacting structural strength/weight and high-temperature resistance demands made of essential structural components. It has been found that brazed stainless-steel and titanium, cellular cored, sandwich panel constructions are particularly adapted to meet the exacting requirements of this class of flying devices. Such brazed panel constructions are essentially of a single basic construction, although, as is obvious, they may assume various shapes and be of different sizes.

A typical panel consists of a cellular type core, such as in the form of a honeycomb of stainless-steel foil, interposed between two facing sheets of light gauge stainless steel, to form a sandwich-like composite. Such basic components, together with edge forming members, doublers, slugs, inserts and/or other necessary elements of the designer's choice, are simultaneously bonded together by a high-temperature brazing process. The resultant construction consists in an integrated, lightweight assembly joined together by a braze bond, and will, in proportion to its weight, withstand the exceptional stresses and high-temperatures imposed by modern, supersonic aircraft and missiles. The general configurations of such sandwich panel construction profiles may be flat or wedge-shaped or may involve simple curvature or compound curvature and may also be tapered.

Accordingly, a principal object of the present invention is to provide a means for manufacturing brazed cellular-cored sandwich panel construction of aircraft and missile quality, having exceptional strength to weight ratios and having optimum heat resistance and insulation characteristics.

Another object of the present invention is to provide novel means for joining metal cellular core to facing plates so that the resultant sandwich structure has exceptionally high strength to weight ratio.

Another object resides in providing improved means for braze-bonding of metal cellular core to facing plates, end closures, doublers, and the like, wherein the resulting sandwich panel structure is highly heat resistant and possesses excellent insulating characteristics.

A further object of the invention resides in the brazing together of metallic elements to form cellular-cored sandwich panel constructions wherein the bonding braze effected is of optimum quality and high integrity.

Yet another object of the invention is the provision of means for joining metal cellular core to metal facing plates and related edge closure elements, doublers, and the like, wherein the component parts are consistently and continually subjected to evenly distributed clamping pressure during the brazing cycle.

A yet further object of the invention is to provide means for joining metal elements of cellular cored sandwich panel constructions wherein the density and composition of the brazing atmosphere is continually and consistently controlled during the brazing cycle.

A still further object resides in the provision of novel means of the above class and character for producing an improved joint between metal cellular core and its related facings, edge closures, doublers, and the like, which means is relatively simple, comparatively cheap and is readily adaptable to production processes.

These and other objects and advantages of the invention, which will appear from the detailed description, consist in the several novel features hereinafter set forth, and will become more readily apparent from the following description of the appended drawings, wherein:

FIGURE 1 is a perspective view, partially cut away, illustrating a typical flat panel construction in a brazing box within the contemplation of the present invention and exemplifying associated brazing forms and tools.

FIGURE 2 is a detailed sectional view of the same panel construction, brazing box, forms and tools, as taken along the line II—II of FIGURE 1.

FIGURE 3 is a perspective view of another embodiment of a brazing box adapted to be employed with simply curved panel constructions.

FIGURE 4 is a detailed sectional view of a typical curved panel construction, brazing box, forms and tools, as taken along the line IV—IV of FIGURE 3.

FIGURE 5 is a perspective view of an expendable type brazing box embodying the present invention.

FIGURE 6 is a detailed sectional view of a typical flat panel construction, with associated brazing forms and tools, in an expendable type brazing box, as taken along the line VI—VI of FIGURE 5.

FIGURE 7 is a perspective view, partially cut away, illustrating a typical retort in which the brazing box is enclosed during the brazing operation; and FIGURE 8 is a sectional view illustrating the retort, in which the brazing box is enclosed, located in a brazing furnace employing means to simultaneously effect a clamping pressure and control the atmosphere in the brazing box.

Particular reference will now be made to the drawings which illustrate a preferred means and method for brazing sandwich panel constructions under controlled pressure and in a controlled atmosphere.

Typicaly the present method includes the step of enclosing panel components, reference tooling and supporting accessories in a vacuum brazing vessel or box, as shown in FIGURES 1 through 6. The panel constructions formed by the method of the present invention are separately indicated in the drawings generally by the numerals 10, 11 and 12, respectively illustrated in FIGURES 1 and 2, 4, and 6. These panel constructions are substantially identical. Each such panel 10, 11 or 12 essentially comprises a cellular core material 13 sandwiched between an inner skin 14 and outer skin 15 (these skins 14 and 15 usually being light gauge stainless steel sheets), and peripheral edge members 16, which are usually Z or channel sections. Core material 13 is formed of thin sheets of stainless steel material suitably formed into a cellular structure, the individual cells usually having a hexagonal configuration and the whole structure being similar in appearance to a honeycomb.

Prior to locating a panel 10, 11 or 12 in a vacuum environment, a prior set-up operation is performed wherein strips or sheets of brazing alloy are placed between the panel components throughout all faying surfaces where a braze is desired, the strips or sheets being appropriately cut and trimmed to size. Thereafter the assembly is tack brazed, usually by an electrical resistance method, at appropriate locations. This tack brazing operation serves to join the panel components together in proper relationship so that the panel structures 10, 11 or 12, per se, may be removed intact from the set-up tool and transferred to a vacuum brazing box or tool 17. The brazing alloy employed is any suitable commercially available brazing material which will adhere the components of the panel into a fixed structure.

Having reference now to FIGURES 1 and 2 there is illustrated the vacuum brazing box 17 adapted to accommodate typical flat panel construction 10. Vacuum brazing box 17 comprises a base 18, side walls 19 and end walls 20 defining a rectangle and having a circumscribing integral outwardly extending peripheral flange 21 provided at the upper ends of such walls. Brazing box 17 is essentially a container for holding the panel 10 during the brazing operation and since it will be subjected to heat is reinforced by corrugations or beads 22 formed in base 18 and spaced gussets 23 welded to side walls 19 to minimize warpage thereof under the application of heat.

A shim plate 24 is located within brazing box 17, resting on base 18 thereof, and positioned on plate 24 is a rectangular brazing block 25. This brazing block 25 is essentially a platen or form block, which serves as a reference tool to control the shape or contour of the panel 10 during the brazing operation. Graphite is a preferred material used for the platen 25, due to its stability at brazing temperatures, its ease of machining and availability. A cover sheet or shield 26, preferably a light gauge sheet of stainless steel, is located on top of platen 25 to prevent possible contamination of the panel 10 by the graphite platen 25 at elevated temperatures. The tack-brazed panel 10 when placed within brazing box 17 rests on cover sheet or shield 26. Panel 10 is reversed when placed in box 17 so that its outer skin 15 is in contact with the cover sheet 26. Inadvertent shifting of the tack-brazed panel 10 is prevented by a plurality of angle-type clips 27 suitably rigidly appended to the cover sheet 26. A filler sheet 28, usually of stainless steel, is next placed over the inner skin 14 of the panel 10, substantially filling the region between the structural edge members 16. Such filler sheets 28 are of the same thickness as the height of the gap which they are intended to fill, and serve to bring the panel surface flush with the structural frame effected by the edge members 16. Since these filler sheets 28 usually warp during brazing operations, they are considered expendable, and may be replaced for each brazing cycle. Filler bars 29, usually fabricated of mild steel (or graphite if of large cross-sectional area), are placed, as shown, on or in the edge members 16 so that their upper surfaces are flush with the upper surfaces of the structural members 16 (if such members 16 are a Z section) or fit closely within a channel-shaped member (not shown) to support same. These filler bars 29 are also considered expendable. It is apparent that the purpose of the filler sheet 28 and the filler bars 29 is to provide a flush or smooth surface on panel 10 to assist in the brazing operation. The size, shape and placement of these filler members will of course be such as are dictated by the components which enter into a panel construction and will be appropriately selected to achieve a desired flush surface as in the example described. After a flush surface has been provided an upper cover sheet 31, also preferably a light gauge sheet of stainless steel, is placed thereupon to lie over the panel 10, filler sheet 28 and filler bars 29.

The brazing box 17 containing the panel 10 and aforementioned brazing tools and forms is covered with a vacuum sheet or diaphragm 32, also preferably of thin gauge stainless steel. This vacuum sheet 32 is trimmed to the outside perimeter of box 17 and the edges welded as at 33 to flange 21 in an air-tight manner. This diaphragm sheet 32 is provided with reinforcing beads 33a to restrict the formation of wrinkles in diaphragm 32 from the seal welding operation at the outer portion of diaphragm 32. Thus, vacuum sheet 32 adapts the brazing box 17 to serve as both a container and a pressure vessel for the panel 10 during the brazing operation. Vacuum sheet 32 is also expendable, and is replaced for each brazing cycle, the weld being removed in any suitable manner.

The brazing box 17 is fitted at an end wall 20 with a tubular vacuum line 34, which extends into said box 17 and is suitably welded to an end wall 20, or, if desired to a side wall 19, in an air-tight manner. A second vacuum line 35, as shown in phantom in FIGURE 8, may be attached to case 17 if circulation of a controlled atmosphere through brazing box 17 should be desired or required. This will be further described in the discussion, later to be made, of the operation of the brazing box.

FIGURES 3 and 4 illustrate the necessary modifications when a curved panel 11 is to be brazed utilizing the method of the present invention. These modifications entail contouring the reference platen or brazing block 25 to match the outer contour of panel 11, providing curved end filler blocks (not shown), and changing the configuration of peripheral flange 21 on brazing box 17 to conform to the desired contour of panel 11. Since the vacuum sheet 32 is capable of yielding slightly to follow irregularities in panel thickness, brazing box flange conformation, etc., flanges 21 may be formed to a relatively open tolerance.

It is understood the present invention contemplates that considerable variation is possible in the construction of the brazing box 17. The invention is not limited to any particular kinds or gauges of metal. For example, either light or relatively heavy gauge material may be employed in the construction of case 17, the former being preferable where warpage of the case 17 under the application of heat might be transmitted to the reference platen or brazing block 25, thus possibly causing distortion or breakage thereof. Furthermore, case 17 may be fabricated as a frame, with suitable vacuum diaphragms 32 on both the upper and lower surfaces. In this form of construction, the flexibility of these two diaphragms prevents the transmission of frame distortion stresses to the vessel contents.

The brazing boxes 17 illustrated in FIGURES 1, 2, 3 and 4 are perishable tools employed as vacuum pressure containers for panels 10 and 11 during the brazing operation. After each brazing cycle, the vacuum sheet 32 is cut off and the flange 21 ground smooth. The box 17 is straightened if necessary, sand blasted and pickled, then a new vacuum sheet 32 fitted after the panel components have been inserted in place, in preparation for the next cycle. The life expectancy of these boxes 17 may be forty to fifty cycles, since a small portion of the flange 21 is ground off in removing weld 33 after each brazing cycle.

FIGURES 5 and 6 illustrate an expendable type of vacuum pressure brazing container, indicated generally by the numeral 40. In this instance, the box-like case as such, or frame as above mentioned, is dispensed with entirely. Rather, container 40 comprises upper and lower vacuum sheets or diaphragms 41 and 42, respectively (of light gauge stainless steel), which sheets are preformed into pan-like structures as shown. When these opposing diaphragms 41 and 42 are mated, they effect a vessel or envelope capable of containing the components of panel 12 and associated brazing tools and forms of the type above described. Sealing is effected by means of seam welds 43 provided at the faying surfaces or peripheral flanges 44 of the diaphragms 41 and 42 to achieve an airtight envelope. A usual vacuum line 34 extends into the interior of the envelope through tunnels 46 formed into the pan flanges 44 (FIGURE 5), the tubing comprising the vacuum line being sealed in place in an air-tight manner as by inert gas arc-welding.

FIGURE 6 illustrates a panel construction 12 encased together with its reference tooling and supporting accessories within envelope 40. Panel construction 12, as above described, includes core 13, inner and outer sheet metal skins 14 and 15 and edge members 16, which are suitably tack brazed to place them in proper relationship. Panel 12 rests on cover plate or shield 26 which in turn overlies platen or brazing block 25. Angle clips 27 are included to locate panel 12 upon cover plate 26. Filler sheet 28 and filler blocks 29 provide a flush surface on which rests cover sheet 31 to complete the setup. Thus the contents of envelope 40 is essentially similar to the contents of box 17.

Use of the brazing box 17 and envelope 40 in a brazing operation will now be discussed.

In a brazing operation, the vacuum vessel, which may be brazing box 17 or expendable brazing envelope 40, having a panel construction in place therein, is placed in a suitable retort 50, illustrated in FIGURES 7 and 8. This brazing retort 50 has a front opening permitting access to the interior thereof and is of a convenient shape to readily accept the vacuum vessel. Retort 50 acts as a secondary container whose principal function is to enclose the vacuum vessel in a controlled atmosphere. It also serves as a pre-conditioner for atmospheric gases and protects the brazing vessel from any sudden changes in temperature that would induce warping. The front opening of retort 50 is adapted to be sealed by a heavily insulated door 51 which is suitably removably secured in place.

Retort 50 is adapted to rest on a dolly or car 52 whose wheels 53 run on tracks 54 extending into a furnace 55 which is open at its front. By use of the dolly, retort 50 may be loaded outside of furnace 55, moved therewithin for the brazing operation, and then removed for cooling. Furnace 55 has a door 56 which is adapted to be sealably fitted at the front opening, and which has a suitable construction to permit sealing about the tracks which lead from the furnace. Furnace door 56 has a central opening 57 which is adapted to be sealed closed by the door 51 which also closes retort 50.

Vacuum line 34 which serves the vacuum brazing vessel 17 or 40, and atmosphere circulation line 35 if one is employed, are brought to the exterior of the furnace through retort door 51 through usual sealing glands 58.

If desired thermocouple leads 61 may be appended to the brazing vessel to obtain temperature indications. These thermocouple leads 61 may be fitted to the brazing vessel in any suitable manner, such as by providing wells (not shown) in the brazing vessel and then suitably holding the ends of the thermocouple leads 61 therewithin. The particular construction of the thermocouple leads 61 or the manner of operatively fitting them to the brazing vessel does not form a part of this invention. Where thermocouples are employed a suitable connection 62 is provided in retort door 51 for such thermocouples.

Retort door 51 is further equipped with entry and exit fluid lines 63 and 64 respectively mounted in suitable glands 65 and 66 whereby the density and composition of the atmosphere within the retort 50 may be controlled through usual suitable valving mechanism (not shown).

It is understood that this invention is not limited to any particular construction of retort or furnace. Any convenient construction may be employed for the retort which will permit the ready accommodation of the brazing vessel while affording a sealed container therefor. Likewise any form of sealable furnace construction may be used which will permit the ready movement of the retort into and out of it.

High temperature brazing must be accomplished in an inert or reducing atmosphere to prevent oxidation of contamination of the panel constructions 10, 11 and 12. The most commonly used reducing atmosphere is dry hydrogen, since it is desirable to maintain a low moisture content in the brazing atmosphere, and also, at elevated temperatures (above 1650° F.), hydrogen readily combines with any oxides remaining on the base metal. This effectively removes all oxides, and since no oxygen is present, no further oxidation can occur. Argon and helium are examples of other inert gases commonly employed in high temperature brazing operations and whose use is also contemplated by this invention.

Thus, retort 50 is purged with an inert gas, which may be dry hydrogen to completely replace the existing atmosphere and prevent occurrence of oxidation during brazing. A constant partial vacuum is drawn in the sealed brazing vessel to effect a uniform "hold-down" pressure on the panel 10, 11 or 12 throughout the brazing cycle. This vacuum also serves to draw off excess gases that occur during the brazing operation. It is apparent that the drawing of a vacuum will cause thin diaphragm 32 to flex and be drawn tightly against the contents of vessel 17, or if vessel 40 is used the diaphragms 41 and 42 will be urged together to provide the holding force. The filler sheet 28 and filler bars 29 within the brazing vessel distribute this "hold-down" pressure from the vacuum sheet 32 or diaphragms 41 and 42 to parts of the panel 10, 11, or 12 which are not in direct contact with the cover sheet 31.

It has been found that a desirable brazing of the panel components is obtained by raising the temperature to 1815° F. and holding it for 15 minutes, then cooling to 1400° F. and holding for 90 minutes, then further cooling to 400° F., each of these steps being accomplished while an inert or reducing atmosphere is maintained in the retort 50 and in the brazing vessel 17 or 40. The brazing vessel is then cooled to room temperature in air, the panel 10, 11 or 12 removed, then refrigerated to −20° F. within 12 hours after leaving the 1400° F. temperature; this completes the transformation of the steel. The ageing (hardening) process consists of heating the panel 10, 11 or 12 in retort 50, in an inert atmosphere, to 1050° F. and holding for 90 minutes, then cooling to room temperature. The panel 10, 11 or 12 is then cleaned, such as by a liquid honing process, then trimmed to size.

Three general methods of providing a suitable brazing environment are possible, while a constant partial vacuum is maintained in the brazing vessel 17 or 40 and a slight positive gauge pressure is maintained in the retort 50.

In the first method, a limited amount of atmospherizing gas is bled into the vacuum vessel through the atmosphere circulation line 35 (FIGURE 8), while atmosphere withdrawal from the vessel is effected through the vacuum line 34. Pressure differential between the interior of the vacuum vessel and the retort atmosphere is regulated by the rate of atmosphere withdrawal through the vacuum tube 34 through suitable mechanism (not shown), or by the volume of gas admitted to the vacuum vessel through the supply line 35.

In the second method, the atmosphere circulation line 35 is omitted and replaced by a relatively small orifice (not shown) in the wall of the brazing vessel or envelope, approximately opposite to the point of entry of the vacuum line 34. Conditioning gas is therefore drawn from the retort atmosphere, and pressure differential is controlled solely by the rate of withdrawal of the brazing vessel's atmosphere through vacuum line 34.

In a third method, both the atmosphere circulation line 35 and orifice mentioned in the second method are dispensed with. The interior of the vacuum vessel is conditioned by drawing a full vacuum through vacuum line 34, after which the desired environmentalizing gas is admitted by means of a valving mechanism (not shown) through the same vacuum line 34. Vacuum is redrawn and the desired conditioning gas readmitted. This process is repeated through several respirations, until a satisfactory dilution of the vacuum vessel's atmosphere has been achieved. At this time, a partial vacuum is drawn on the brazing vessel to achieve a pressure differential between the vessel's atmosphere and the retort atmosphere, while the vessel or envelope and its contents are undergoing heating. This pressure differential may be varied as required during the heating and subsequent cooling cycles.

The herein described apparatus and process for braze-bonding metal cellular core to facing plates, edge closures, slugs, doublers and other related elements to form sandwich panel constructions wherein evenly distributed pressure is consistently applied to the combination of such elements and the density and composition of the workpiece's ambient atmosphere is controlled throughout the brazing operation is characterized as an improved means and method of manufacturing composite cellular-cored sandwich panels of exceptional strength/weight ratio, high structural integrity and optimum heat resistance and insulating qualities.

While certain preferred embodiments of the invention have been specifically disclosed it is understood that the invention is not limited thereto as many variations will be readily apparent to those skilled in the art and the invention is to be given its broadest possible interpretation within the terms of the following claims.

What I claim is:

1. A brazing tool for use in brazing together a structural sandwich comprising a metallic cellular core, top and bottom metallic skin sheets and peripheral edge members, said brazing tool comprising an open top metallic box-like vessel having a base and integral side and end walls, having a peripheral flange extending outwardly from said side and end walls and circumscribing said open top, and having a cover closing said open top formed of a thin, flexible metallic sheet rigidly affixed to said peripheral flange to effect an air-tight structure for containing said structural sandwich, reference tooling positioned within said vessel for locating and maintaining the components of said structural sandwich in desired relationship during a brazing operation, a vacuum line connected to said vessel for producing a vacuum condition within said vessel to cause said flexible cover to be inwardly drawn to exert a holding force upon the components of said structural sandwich, and a gas line communicating with the interior of said vessel and cooperating with said vacuum line for circulating a reducing gas through said vessel, said reference tooling including a form block for supporting the components of said structural sandwich, filler elements cooperating with said components to form a flush and planar surface across the entire area against which said holding force is applied, and a cover sheet for overlying said filler elements and said structural sandwich and engageable by said flexible cover to transmit said holding force to said components of said structural sandwich.

2. A brazing tool for use in brazing together a structural sandwich comprising a metallic cellular core, top and bottom metallic skin sheets and peripheral edge members, said brazing tool comprising a closed container embodying a pair of like pan-shaped members having peripheral flanges, said pan-shaped members being formed of thin, flexible sheet metal and being rigidly secured together at their peripheral flanges in face-to-face relation to define an air-tight chamber for receiving said structural sandwich, reference tooling positioned within said air-tight chamber for locating and maintaining the components of said structural sandwich in desired relationship during a brazing operation, and a vacuum line communicating with said air-tight chamber for use in producing a vacuum condition within said container for flexing said pan-shaped members to produce a holding force upon said components of said structural sandwich, said reference tooling including a form block for supporting the components of said structural sandwich, filler elements cooperating with said components to form a flush and planar surface across the entire area and a cover sheet for overlying said filler elements and structural sandwich and engageable by wall portions of a pan-shaped member during a vacuum condition to transmit a holding force to said components of said structural sandwich.

References Cited in the file of this patent
UNITED STATES PATENTS

| | | |
|---|---|---|
| 1,096,068 | Streichert | May 12, 1914 |
| 1,152,610 | De Bats | Sept. 7, 1915 |
| 1,734,380 | Hitchcock | Nov. 5, 1929 |
| 2,154,273 | Kollsman | Apr. 11, 1939 |
| 2,276,004 | Vidal et al. | Mar. 10, 1942 |
| 2,276,847 | Kelley | Mar. 17, 1942 |
| 2,614,517 | Peterson | Oct. 21, 1952 |
| 2,686,957 | Koerper | Aug. 24, 1954 |
| 2,691,952 | Wilson et al. | Oct. 19, 1954 |
| 2,700,632 | Ackerlind | Jan. 25, 1955 |
| 2,713,196 | Brown | July 19, 1955 |
| 2,824,364 | Bovenkerk | Feb. 25, 1958 |
| 2,845,698 | Giovannucci et al. | Aug. 5, 1958 |
| 2,919,487 | Stiles et al. | Jan. 5, 1960 |
| 2,966,738 | Bertossa | Jan. 3, 1961 |
| 2,978,806 | Herbert | Apr. 11, 1961 |